United States Patent [19]
Onoda et al.

[11] Patent Number: 5,516,350
[45] Date of Patent: May 14, 1996

[54] PROCESS FOR PRODUCING SYNTHETIC QUARTZ GLASS POWDER

[75] Inventors: Hajime Onoda; Hiroshi Ota, both of Tokyo; Kazumi Kimura; Akira Utsunomiya, both of Kitakyushu; Masaru Shimoyama, Nakama, all of Japan

[73] Assignee: Kimmon Manufacturing Co., Ltd. and Mitsubishi Chemical Corporation, Tokyo, Japan

[21] Appl. No.: 260,453

[22] Filed: Jun. 14, 1994

[30] Foreign Application Priority Data

Jun. 15, 1993 [JP] Japan ................................ 5-143548

[51] Int. Cl.⁶ ........................................................ C03B 8/00
[52] U.S. Cl. .............................. 65/17.2; 65/33.1; 65/440
[58] Field of Search ............................ 65/33.1, 440, 17.2

[56] References Cited

U.S. PATENT DOCUMENTS 4,625,001 11/1986 Tsubakimoto et al. .................... 526/88
4,853,198 8/1989 Orii et al. ................................ 423/335
4,865,829 9/1989 Hattori et al. .......................... 423/338

FOREIGN PATENT DOCUMENTS 0385753 9/1990 European Pat. Off. ..
0578553 1/1994 European Pat. Off. ..
62-176928 8/1987 Japan .

OTHER PUBLICATIONS

Derwent Section Ch, Week 9309, Class L Abstract JP5017122 (Shinetsu Chemical) Jan. 1993.
Patent Abstracts of Japan vol. 14, No. 456 (C–765) Oct. 1990 JP2180723.

*Primary Examiner*—David L. Lacey
*Assistant Examiner*—Sean Vincent
*Attorney, Agent, or Firm*—Nixon & Vanderhye

[57] ABSTRACT

Synthetic quartz glass powder is produced by (a) hydrolyzing an alkoxysilane to form a gel, (b) finely dividing the gel and then drying, or drying the gel and then finely dividing, and (c) calcining the obtained powder, the powder being maintained under an atmosphere with an oxygen concentration of not less than 30 vol % during at least a part of the calcining period at a temperature of not lower than 1,000° C.

5 Claims, No Drawings

PROCESS FOR PRODUCING SYNTHETIC QUARTZ GLASS POWDER

BACKGROUND OF THE INVENTION

The present invention relates to a synthetic quartz glass powder suited for use as a raw material for ultra-high purity quartz glass products used in the field of semiconductor production, especially in the high temperature region of not lower than 1,000° C.

Crucibles used for producing semiconductor single crystals and jigs have been manufactured by powdering natural quartz and fusing the powder. Natural quartz, even high-quality, contains various metallic impurities and is not entirely satisfactory in respect of purity. If metallic impurities contaminate high-purity single crystals, whose importance and demand are increasing with the recent trend toward higher performance in the semiconductor industries, the performance of the semiconductors produced therefrom is adversely affected to an objectionable degree, so that it is unacceptable to use crucibles or jigs which have possible contamination with metallic impurities. Thus, high-purity quartz glass powder produced by synthesis is required.

Recently, quartz glass produced by the sol-gel method using alkoxysilane as a raw material has been proposed as a high-purity silicate source. For instance, Japanese Patent Application Laid-Open (KOKAI) No. 62-176928 (1987) discloses a method for producing quartz (silica) glass powder by hydrolyzing alkoxysilane at a specified pH to prepare a gel, powdering the gel, and after drying, calcining the powder.

In the production of synthetic quartz glass powder by the sol-gel method, alkoxysilane used as a raw material is first hydrolyzed and polycondensed to form a wet gel and then the by-product alcohols and water are removed by drying to obtain a dry gel. In the above reaction, however, 100% of the alkoxy groups are not reacted and some of them remain in the dry gel as bound alkoxy groups. Also, the alcohols generated as by-product of the reaction are partly left in the dry gel. In fact, determinations show that carbon concentration in the dry gel is 1,000 to 10,000 ppm.

When the dry gel is calcined, carbon is mostly burned away but some may remain unburned and such unburned carbon may be trapped in glass to appear as black contaminant. When such black contaminant intermixes in a synthetic quartz powder product, it may give rise to CO or $CO_2$ gas causing foaming when the powder product is fused for molding into a crucible or an ingot. Attempts have been made to prevent formation of such black contaminant; for instance, the dry gel has been maintained at a temperature in the range of 400°–600° C. before the pores in the dry gel are closed so as to remove carbon from the dry gel. These attempts have not been entirely satisfactory and do not completely prevent formation of black contaminant. The thus produced foam-containing quartz crucibles or furnace core tubes had the various problems such as deterioration of dimensional stability in use at a high temperature and bursting of the foams during lift-up of single crystals to cause undulation of liquid level and crystal defects.

As a result of the present inventors' studies, it has been found that when producing of synthetic quartz glass powder by the sol-gel method, when at least a part of the calcining step at a temperature of not lower than 1,000° C. is conducted in an atmosphere with an oxygen concentration of not less than 30 vol %, it is possible to obtain a synthetic quartz glass powder in which formation of black contaminant is substantially inhibited during production. This synthetic quartz glass, therefore, forms few foams during fusion molding.

SUMMARY OF THE INVENTION

An object of the present invention is to provide a process for producing a synthetic quartz glass powder which is substantially free of black contaminant and which causes no or only a limited degree of foaming during fusion molding.

In a first aspect of the present invention, there is provided a process for producing a synthetic quartz glass powder, including the steps of (a) hydrolyzing an alkoxysilane to form a gel thereof, (b) finely dividing the gel and then drying the divided substance, or drying the gel and then finely dividing the dried substance, and (c) calcining the obtained powder, the powder being maintained under an atmosphere with an oxygen concentration of not less than 30 vol % during at least a part of the calcining period at a temperature of not lower than 1,000° C.

In a second aspect of the present invention, there is provided a process for reducing black contaminant in a synthetic quartz glass powder, which comprises calcining the synthetic quartz glass powder, the powder being maintained under an atmosphere with an oxygen concentration of not less than 30 vol % during at least a part of the calcining period at a temperature of not lower than 1,000° C.

DETAILED DESCRIPTION OF THE INVENTION

Hydrolysis of alkoxysilane by the sol-gel method can be accomplished by reacting an alkoxysilane with water in a known way. The alkoxysilane used as a starting material is preferably a $C_{1-4}$ lower alkoxysilane such as tetramethoxysilane or tetraethoxysilane or an oligomer thereof.

The amount of water used for the reaction is usually in the range of 1 to 10 equivalents to the alkoxy group in the alkoxysilane. If necessary, an organic solvent such as an alcohol or an ether may be added to the reaction system. Suitable alcohols include methanol, ethanol, propanol, butanol and the like. An acid such as hydrochloric acid or acetic acid or an alkali such as ammonia may be used as a catalyst. The pH for the hydrolysis in the hydrolysis reaction is usually 3 to 12.

For obtaining high-purity synthetic quartz glass powder, all the substances introduced into the reaction system, such as alkoxysilane, water and solvent, are preferably of high purity.

In the process of the present invention, it is possible to obtain a gel immediately from the hydrolyzed alkoxysilane by heating the hydrolyzate, but since gelation takes place and is completed in several hours even when the hydrolyzate is left at normal temperature, it is possible to control the gelation time by adjusting the degree of heating. The obtained gel may be finely divided and then dried, or it may be first dried and then finely divided. The particle size of the dried silica gel powder is usually 60 to 900 μm, preferably 80 to 800 μm in diameter.

The degree of drying the gel is usually 1 to 10% by weight in terms of $H_2O$ content. Drying of the gel is usually carried out by heating to 100° to 200° C. in vacuum or in an inert gas.

The dry silica gel powder produced in the manner described above is calcined such that at least part of the heating operation is at least 1,000° C., preferably in the range of 1,000° to 1,400° C., in the calcining step is performed in an atmosphere in which the oxygen concentration is not less than 30 vol %, preferably not less than 50 vol %, more preferably 70 to 100 vol %. The calcination is usually conducted at not lower than 1000° C., preferably 1100° to 1300° C. The calcination time is 1 to 100 hours.

It is essential that at least a part of the calcining step in the temperature region of not lower than 1,000° C. is in an atmosphere with the above-specified oxygen concentration. The time in which the dry silica gel powder is maintained in an atmosphere with an oxygen concentration of not less than 30 vol % at a temperature of not lower than 1,000° C. is not less than 30 minutes, preferably 1 to 30 hours in the calcining step. When this time is shorter than 30 minutes, formation of black contaminant in the production process is not suitably reduced.

The same atmosphere may be maintained throughout the calcining step, that is, from start of calcination at room temperature until calcination is completed. In this way, according to the present invention, even after the pores in the dry gel have been closed and black contaminant has already been generated, it is possible to reduce such black contaminant.

When calcination is carried out in an atmosphere with an oxygen concentration of not less than 30 vol % at a temperature below 1,000° C. the formation of black contaminant by calcination in normal air atmosphere at a temperature of not lower than 1,000° C. is not suppressed. Also, when the temperature exceeds 1,400° C., the powder particles may become sintered to each other to lose fluidity, making it difficult to carry out the ensuing treatments.

The calcination described above can be also applied to a synthetic quartz glass powder containing black contaminant to reduce the black contaminant.

The quartz glass powder obtained after calcination described above contains little black contaminant; usually the number of pieces of black contaminant in the produced synthetic quartz glass powder is not more than 30, preferably not more than 10 per kg of the powder. By fusion molding this quartz glass powder with little black contaminant, can be produced an ingot or crucible having few.

EXAMPLES

The present invention is further illustrated below with reference to the examples, which examples however are merely intended to be illustrative and not to be construed as limiting the scope of the invention.

Example 1

Tetramethoxysilane and 5 equivalents of water were supplied to a stirring tank and stirred at 30° C. for one hour for inducing a hydrolysis reaction to form a homogeneous sol solution. This solution was transferred into a vinyl chloride vat and left for 12 hours to gel. The formed gel was dried by a 140° C. vacuum dryer for 12 hours and then the particle size was adjusted to 100 to 500 μm. 1 kg of the dry silica gel powder was supplied into covered a quartz container (200 mm ×200 mm ×150 mm) and the container was placed in an electric furnace. A gas with an oxygen concentration of 100 vol % was introduced into the container at a rate of 1 l/min and then the inside of the container was heated to 1,220° C. at a rate of 200 ° C./hr and maintained at 1,220° C. for 10 hours. After cooling naturally, the synthetic quartz glass powder was taken out of the container and checked for the presence of black contaminant. Only one piece of black contaminant was seen visually in the powder. The powder was then fused in a Verneuil's fusing apparatus by heating with oxygen/hydrogen flames, formed into a 12 mm φ×50 mm ingot and the ingot was checked for foams. No foam was found in the ingot.

Example 2

The same procedure as Example 1 was carried out except that the oxygen concentration of the gas introduced for calcination was reduced to 50 vol %. The results are shown in Table 1.

Example 3

The same procedure as Example 1 was carried out except that the oxygen concentration of the gas introduced for calcination was reduced to 35 vol %. The results are shown in Table 1.

Comparative Example 1

A dry silica gel powder was prepared in the same way as Example 1, and 1 kg of this powder was supplied to a covered quartz container (200 mm ×200 mm ×150 mm) and placed in an electric furnace. Air (oxygen concentration: 21 vol %) was introduced into the container at a rate of 1 l/min and the inside of the container was heated to 1,220° C. at a rate of 200° C./hr and maintained at 1,220° C. for 10 hours. After cooling naturally, the synthetic quartz glass powder was taken out of the container and checked for black contaminant. 42 pieces of black contaminant were visually recognized in the powder. From the powder, a 12 mm φ×50 mm ingot was made by Verneuil's method and checked for foams. Many foams were found in the ingot.

Example 4

1 kg of a synthetic quartz glass powder already containing black contaminant, produced in the same way as Comparative Example 1, was supplied to a covered quartz container (200 mm ×200 mm ×150 mm) and placed in an electric furnace. A gas with an oxygen concentration of 100 vol % was introduced into the container at the rate of 1 l/min and the inside of the container was heated to 1,300° C. at a rate of 200° C./hr and maintained at 1,300° C. for 10 hours. After cooling naturally, the synthetic quartz glass powder was taken out of the container and checked for black contaminant. Only 4 pieces of black contaminant could be visually confirmed. From this powder, a 12 mm φ×50 mm ingot was made by Verneuil's method. Although 2 very small foams were observed, the obtained ingot was generally high-grade.

TABLE 1

|  | Calcining conditions | | | Black contaminant (pieces/kg) | Foams in ingot |
| --- | --- | --- | --- | --- | --- |
|  | Oxygen conc. in gas (vol %) | Temp. (°C.) | Time (hr) | | |
| Example 1 | 100 | 1220 | 10 | 1 | ⊙: No foam. |
| Example 2 | 50 | 1220 | 10 | 5 | ○: 4–5 of very small foams. |
| Example 3 | 35 | 1220 | 10 | 30 | Δ: 15 of very small foams. 3–4 of aggregated foams. |
| Comparative Example 1 | 21 | 1220 | 10 | 42 | X: Plenty of foams. |
| Example 4 | 100 | 1300 | 10 | 4 | ○: 2 of very small foams |

What is claimed is:

1. A process for producing a synthetic quartz glass powder, which comprises the steps of:
   (a) hydrolyzing an alkoxysilane to form a gel thereof,
   (b) finely dividing the gel and then drying, or drying the gel and then finely dividing to form a powder, and
   (c) calcining the powder of step (b), the powder being maintained under an atmosphere with an oxygen concentration of not less than 30 vol % during at least a part of calcining at a temperature of not lower than 1,000° C.

2. The process according to claim 1, wherein the at least a part of the calcining step is conducted under an atmosphere with an oxygen concentration of not less than 50 vol %.

3. The process according to claim 1, wherein the calcining step is carried out at 1,000° to 1,400° C.

4. The process according to claim 1, wherein in step (c) the powder is maintained under an atmosphere with an oxygen concentration of not less than 30 vol % at a temperature of not lower than 1,000° C. for at least 30 minutes.

5. A process for reducing black contaminant in a synthetic quartz glass powder, which comprises calcining the synthetic quartz glass powder while maintaining it in an atmosphere with an oxygen concentration of not less than 30 vol % during at least a part of the calcining at a temperature of not lower than 1,000° C.

* * * * *